United States Patent
Mizoguchi et al.

(10) Patent No.: US 8,881,891 B2
(45) Date of Patent: Nov. 11, 2014

(54) BELT UNIT AND IMAGE FORMING APPARATUS

(71) Applicant: Sharp Kabushiki Kaisha, Osaka (JP)

(72) Inventors: Fumito Mizoguchi, Osaka (JP); Masashi Hirai, Osaka (JP); Toshiki Takiguchi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 13/680,594

(22) Filed: Nov. 19, 2012

(65) Prior Publication Data
US 2013/0126314 A1 May 23, 2013

(30) Foreign Application Priority Data
Nov. 18, 2011 (JP) .................................. 2011-252453

(51) Int. Cl.
*B65G 15/46* (2006.01)
*G03G 15/16* (2006.01)

(52) U.S. Cl.
CPC ............ *B65G 15/46* (2013.01); *G03G 15/1615* (2013.01); *G03G 2215/00151* (2013.01); *G03G 2215/00168* (2013.01); *G03G 2215/0132* (2013.01)
USPC ............................. 198/835; 198/840; 399/165

(58) Field of Classification Search
USPC ........... 198/835, 840, 842; 399/162, 165, 302
See application file for complete search history.

(56) References Cited

U.S. PATENT DOCUMENTS

| 5,017,969 A * | 5/1991 | Mitomi et al. ................ 399/299 |
| 6,160,978 A * | 12/2000 | Tsuruoka et al. ............. 399/165 |
| 6,733,407 B2 * | 5/2004 | Wakana .......................... 474/92 |
| 7,136,611 B1 * | 11/2006 | Murase .......................... 399/165 |
| 7,242,897 B2 * | 7/2007 | Satoh et al. .................... 399/329 |
| 7,536,144 B2 * | 5/2009 | Ohta ............................. 399/302 |
| 7,957,684 B2 * | 6/2011 | DeHollander et al. ......... 399/302 |
| 8,032,051 B2 * | 10/2011 | Takiguchi et al. ............. 399/101 |
| 2007/0048014 A1 * | 3/2007 | Mori ............................. 399/165 |
| 2009/0263154 A1 * | 10/2009 | Izumi et al. ................... 399/101 |

FOREIGN PATENT DOCUMENTS

| JP | 01-300280 | 12/1989 |
| JP | 05-134486 | 5/1993 |
| JP | 11-282262 | 10/1999 |
| JP | 2004-046199 | 2/2004 |
| JP | 2010-152063 | 7/2010 |

\* cited by examiner

*Primary Examiner* — Mark A Deuble
(74) *Attorney, Agent, or Firm* — Nixon & Vanderhye, P.C.

(57) ABSTRACT

A belt unit is provided with an endless belt, a driving roller, and a pair of guide ribs. The driving roller is disposed on an inner peripheral surface side of the endless belt and drives the endless belt. The pair of guide ribs is placed on each opposite widthwise end of the inner peripheral surface of the endless belt and contacts both end faces of the driving roller, thus preventing meandering of the endless belt. Additionally, the driving roller is equipped with a low friction region at both opposite lengthwise ends in a predetermined width and the low friction region is configured to have a friction coefficient that is lower than a friction coefficient of a region adjacent to the low friction region.

4 Claims, 13 Drawing Sheets

BELT UNIT AND IMAGE FORMING APPARATUS

CROSS REFERENCE

This Nonprovisional application claims priority under 35 U.S.C. §119(a) on Patent Application No. 2011-252453 filed in Japan on Nov. 18, 2011, the entire contents of which are hereby incorporated by reference.

BACKGROUND OF THE INVENTION

The present invention relates to a belt unit capable of enhancing the meandering prevention of an endless belt and also to an image forming apparatus equipped with the belt unit.

Conventionally, as driving rollers that drive an endless belt used for equipment such as OA (Office Automation) equipment, is for example, driving rollers that include a roller body and elastic rubber that wound around the surface of the roller body had been known.

In recent years, however, improvement in the speed and colorization of copying machines, laser beam printers (LBP), and the like has been developed, so that the above mentioned driving rollers with the endless belt, due to the variation in the speed of feeding the endless belt by the driving roller and the irregularities of the surface of the endless belt, have problems such as character skew, image stretch, and color deviation. Thus, the dimensional precision of the driving roller and the driving precision of the belt have been very crucial.

In an attempt to solve such problems, as the driving rollers for the OA equipment, driving rollers that include sponge-typed elastic rubber that is wound around the roller body have been disclosed (see Japanese Laid-Open Patent Publication 2010-152063, for example).

However, in Japanese Laid-Open Patent Publication 2010-152063, a guide rib disposed in the endless belt is likely to overrun on the driving roller for an extended time. This is because the whole external peripheral surface of the driving roller disclosed in Japanese Laid-Open Patent Publication 2010-152063 is wound with sponge typed elastic rubber and the elastic rubber is entirely made of a material having a high friction coefficient.

In view of the problem described above, an object of the present invention is to provide a belt unit that can prevent a guide rib from overrunning on a driving roller for an extended time.

SUMMARY OF THE INVENTION

A belt unit of the present invention is provided with an endless belt, a driving roller, and a pair of guide ribs.

The driving roller is disposed on an inner peripheral surface side of the endless belt and drives the endless belt. The pair of guide ribs is placed on each opposite widthwise end of the inner peripheral surface of the endless belt and contacts both end faces of the driving roller, thus preventing meandering of the endless belt. Additionally, the driving roller is equipped with a low friction region at both opposite lengthwise ends in a predetermined width and the low friction region is configured to have a friction coefficient that is lower than a friction coefficient of a region adjacent to the low friction region.

With this configuration, even if the guide ribs overrun on the driving roller, since the frictional force generated between the guide ribs and a low friction region is small, the guide ribs return to a position in which each of the guide ribs contacts an end face of the driving roller by sliding toward the end face of the driving roller. Therefore, the guide ribs can be is prevented from overrunning on the driving roller for an extended time.

The foregoing and other features and attendant advantages of the present invention will become more apparent from the reading of the following detailed description of the invention in conjunction with the accompanying drawings.

DETAILED DESCRIPTION OF THE INVENTION

Hereinafter, a belt unit according to an embodiment of the present invention will be described in detail with reference to the drawings.

To begin with, description will be made of a first embodiment of the present invention.

Figure 1:
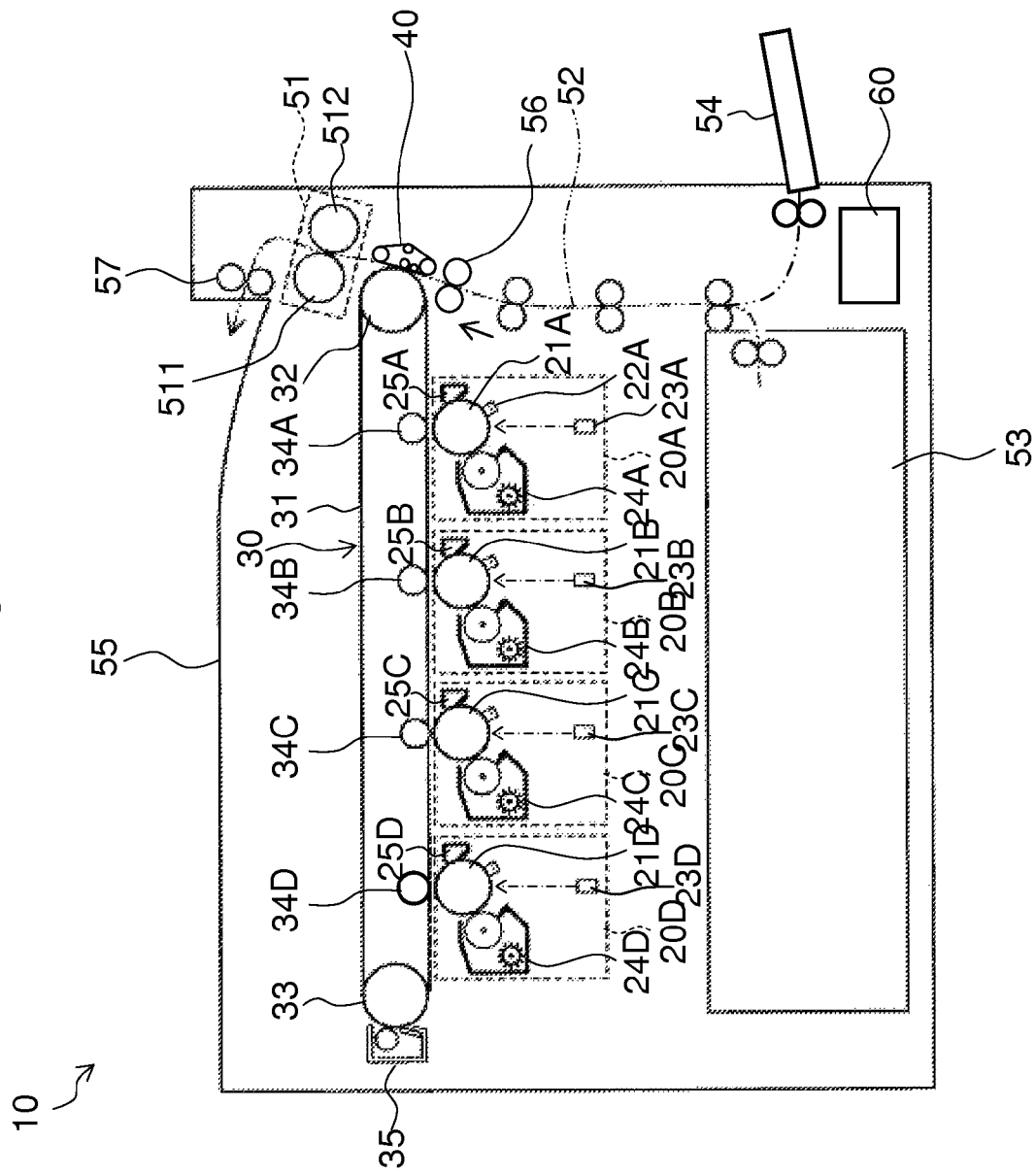
FIG. 1 is a front view of a configuration of an image forming apparatus that is equipped with a secondary transfer belt unit according to a first embodiment of the present invention.

FIG. 1 is a front view of a configuration of an image forming apparatus 10 that is equipped with a secondary transfer belt unit 40 according to the first embodiment of the present invention.

The image forming apparatus 10 is provided with a plurality of image forming portions 20A, 20B, 20C, and 20D, a primary transfer unit 30, a secondary transfer belt unit 40, a fixing unit 51, a paper feed path 52, a sheet feed cassette 53, a manual feed tray 54, a paper output tray 55, and a control portion 60. The control portion 60 controls each part of the image forming apparatus 10 in an integrated manner.

The image forming apparatus 10 carries out an electrophotographic image forming process using image data corresponding to four colors: black and the three subtractive primary colors, that is, cyan, magenta and yellow, obtained by color separation of a color image. The image forming portions 20A to 20D are configured to form toner images (developer images) of the respective colors. The image forming portions 20A to 20D are horizontally arranged in a row along the primary transfer unit 30.

The following description is directed mainly to the image forming portion 20A. The other image forming portions 20B to 20D are substantially similar in configuration to the image forming portion 20A. The image forming portion 20A, which is associated with black, includes a photoreceptor drum 21A, a charger device 22A, an exposure device 23A, a developing device 24A, and a cleaning unit 25A and is configured to form a black toner image by the electrophotographic image forming process.

The photoreceptor drum 21A and photoreceptor drums 21B, 21C, and 21D with which the image forming portions 20B to 20D are provided, are rotated in one direction by a driving force transmitted from a non-illustrated driving motor. The photoreceptor drum 21A is an image bearing element for monochromatic images, and the photoreceptor drums 21B to 21D are image bearing elements for color images.

The charger device 22A is disposed as opposed to the peripheral surface of the photoreceptor drum 21A and configured to charge the peripheral surface of the photoreceptor drum 21A to a predetermined potential.

The exposure device 23A is configured to irradiate the n peripheral surface of the photoreceptor drum 21A with a laser beam modulated according to black image data. By such irradiation, an electrostatic latent image according to the black image data is formed on the peripheral surface of the photoreceptor drum 21A.

The developing device 24A stores black toner (developer). The developing device 24A supplies the toner to the peripheral surface of the photoreceptor drum 21A to develop the electrostatic latent image into a toner image.

The developing devices 24B to 24D of respective of the other image forming portions 20B to 20D store cyan toner, magenta toner, and yellow toner, respectively, and the photoreceptor drums 21B to 21D of the respective image forming portions 20B to 20D are configured to form a cyan toner image, a magenta toner image, and a yellow toner image, respectively.

The primary transfer unit 30 has a primary transfer belt 31, a primary transfer driving roller 32, a primary transfer driven roller 33, primary transfer rollers 34A to 34D, and an primary transfer belt cleaning unit 35.

The primary transfer belt 31 is in the form of an endless belt and is stretched over the primary transfer driving roller 32 and the primary transfer driven roller 33 to move around the driving and driven rollers in a predetermined direction. The outer peripheral surface of the primary transfer belt 31 is opposed to the photoreceptor drums 21A to 21D of the respective image forming portions 20A to 20D.

The primary transfer rollers 34A to 34D are positioned as opposed to the respective photoreceptor drums 21A to 21D with the primary transfer belt 31 held between the rollers and drums. The region in which the outer peripheral surface of the primary is transfer belt 31 is opposed to the photoreceptor drums 21A to 21D is a primary transfer region.

The cleaning unit 25A is configured to collect residual toner remaining on the peripheral surface of the photoreceptor drum 21A after the primary transfer following the developing step.

The secondary transfer belt unit 40 is configured to be capable of contacting and separating from the primary transfer driving roller 32 with the primary transfer belt 31 held between the unit and the belt. The region in which the primary transfer belt 31 and the secondary transfer belt unit 40 are pressed against each other is a secondary transfer region.

The photoreceptor drums 21A to 21D are disposed, from a direction closer to the secondary transfer region, in the order of the photoreceptor drum 21A for black, the photoreceptor drum 21B for cyan, the photoreceptor drum 21C for magenta, and the photoreceptor drum 21D for yellow. The toner image born on the outer surface of the primary transfer belt 31 is fed to the secondary transfer region as the primary transfer belt 31 is moved.

The sheet feed cassette 53 stores sheets. On the manual feed tray 54, non-standard size sheets or thick paper sheets are placed. The sheet feed path 52 is configured to guide each of the sheets fed from the sheet feed cassette 53 or the manual feed tray 54 to the paper output tray 55 via the secondary transfer region and the fixing unit 51.

A registration roller 56 is disposed near the upstream side of the secondary transfer region in the sheet feed direction. The sheet fed from the sheet feed cassette 53 or the manual feed tray 54 to the paper feed path 52 comes to abut against the registration roller 56 in a stationary state, so that the direction of the sheet is corrected, and is supplied to the secondary transfer region by the registration roller 56 that starts rotating at a predetermined timing. The sheet thus fed into the secondary transfer region is brought into intimate contact with the primary transfer belt 31.

A predetermined secondary transfer electric field is formed in a secondary transfer region, so that the toner image born on the primary transfer belt 31 is secondarily transferred to the sheet.

The primary transfer belt cleaning unit 35 collects residual toner of the toner born on the primary transfer belt 31 that remains on the primary transfer belt 31 without having been transferred to the sheet. This prevents color mixture from occurring in the subsequent steps.

The fixing unit 51 has a heating roller 511 and a pressure roller 512. The heating roller 511 and the pressure roller 512 are pressed against each other. The fixing unit 51 heats and pressurizes the sheet by holding the sheet with a nip portion between the heating roller 511 and the pressure roller 512 and is feeding the sheet, thereby firmly fixing and fusing the toner image to the sheet. The sheet on which the toner image thus fixed and fused is output to the paper output tray 55 by a pair of paper output rollers 57.

Figure 2:
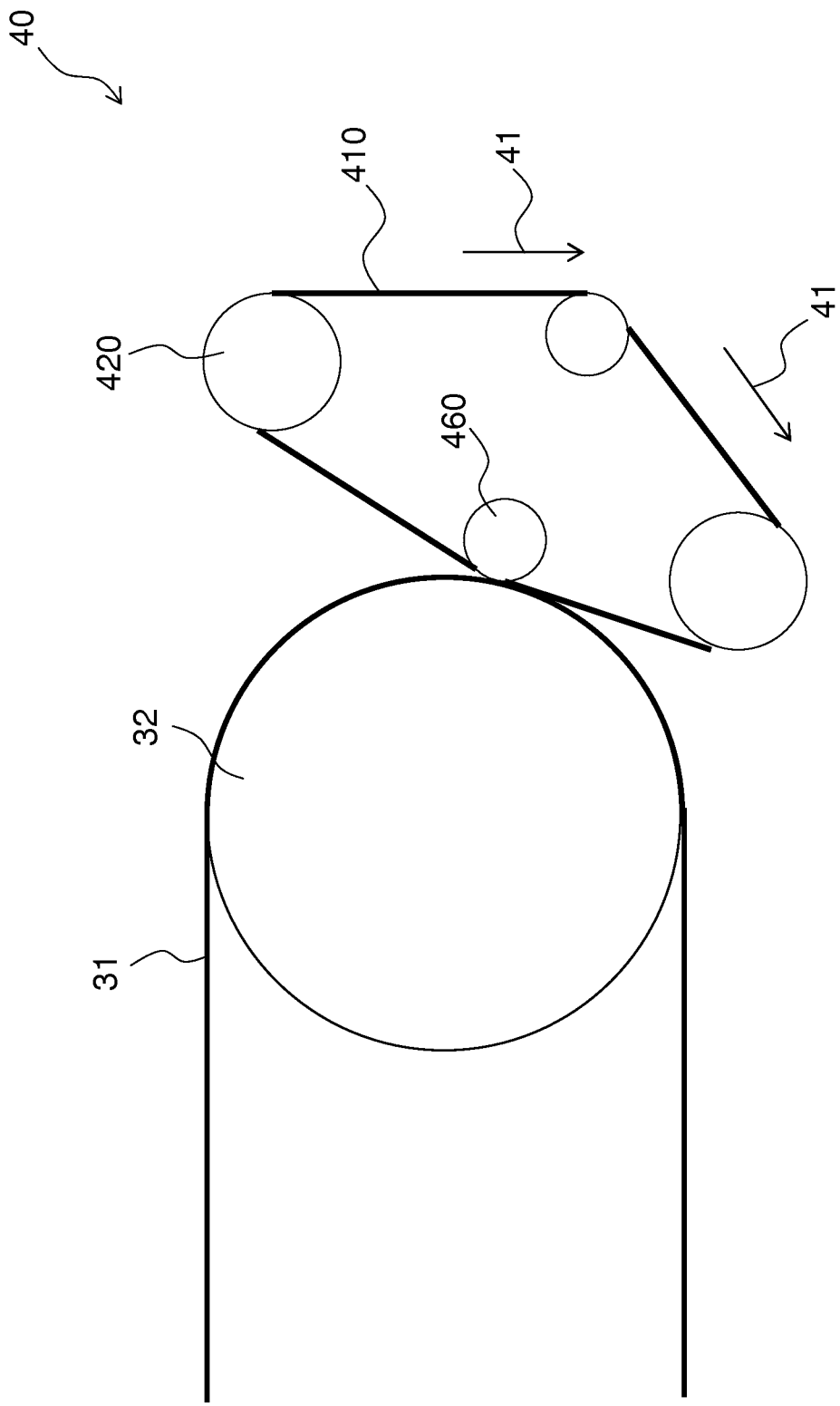
FIG. 2 is a front view of a configuration of the secondary transfer belt unit according to the first embodiment of the present invention.
Figure 3:
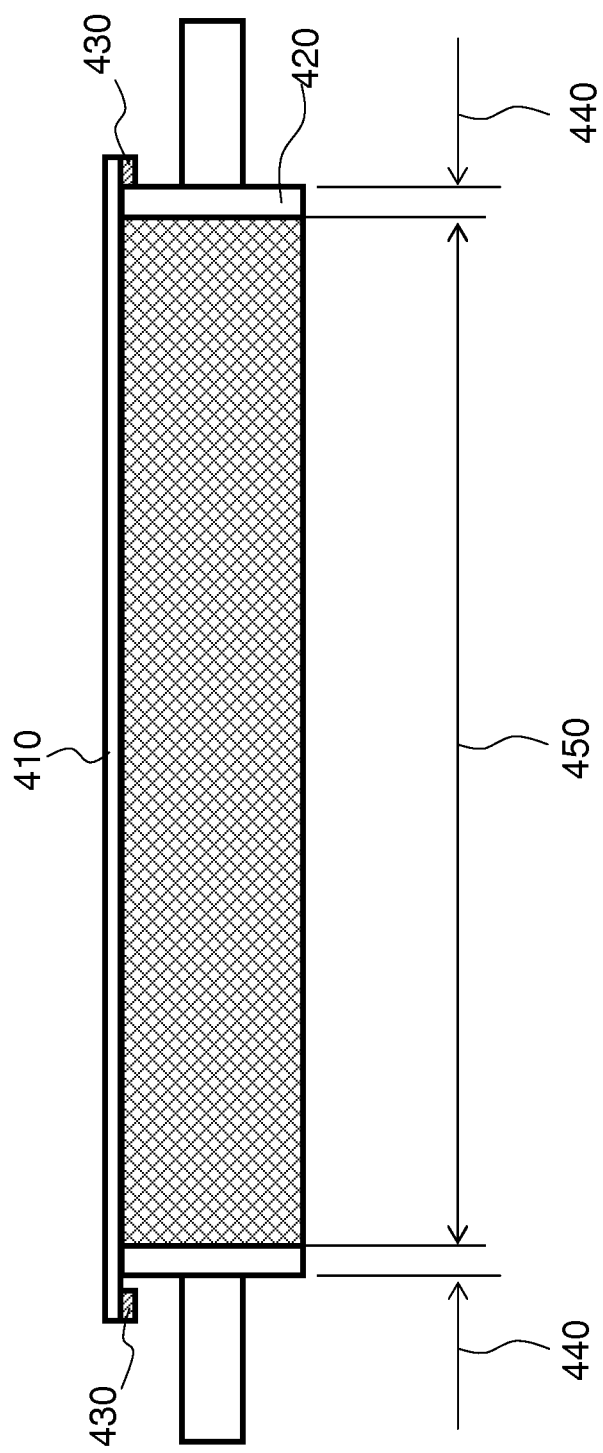
FIG. 3 is a side elevational view of the configuration of the secondary transfer belt unit according to the first embodiment of the present invention.

FIG. 2 is a front view of a configuration of the secondary transfer belt unit 40 according to the first embodiment of the present invention. FIG. 3 is a side elevational view of the configuration of the secondary transfer belt unit 40 according to the first embodiment of the present invention.

The secondary transfer belt unit 40 is provided with a secondary transfer belt 410, a driving roller 420, a pair of guide ribs 430, and a secondary transfer roller 460.

The secondary transfer belt 410 is an endless belt that is stretched over the driving roller 420 and the secondary transfer roller 460, and forms a nip portion between the primary transfer belt 31 and the secondary transfer belt 410. The driving roller 420 is disposed on the inner peripheral surface side of the secondary transfer belt 410 and drives the secondary transfer belt 410. The pair of guide ribs 430 is disposed at opposite widthwise ends of the inner peripheral surface of the secondary transfer belt 410 and prevents the secondary transfer belt 410 from meandering by contacting opposite end faces of the driving roller 420.

The secondary transfer roller 460 may be disposed as opposed to the primary transfer belt 31 that contacts the is secondary transfer belt 410 and has a surface on which a toner image is formed. In addition, the secondary transfer roller 460 may preferably transfer the toner image that is formed on the primary transfer belt 31 to a sheet that reaches a position in which the secondary transfer belt 410 and the primary transfer belt 31 contact each other.

The driving roller 420 is configured to provide a predetermined widthwise low friction region 440 at opposite lengthwise ends, and the low friction region 440 has a friction coefficient that is lower than a friction coefficient of a region 450 adjacent to the low friction region 440.

As an example of such measures, as shown in FIG. 3, the base surface of the driving roller 420 is exposed as the low friction region 440, and the base surface of the driving roller 420 is knurl processed in the region 450. With this configuration, the low friction region 440 is configured to have a friction coefficient that is lower than a friction coefficient of a region 450.

With this configuration, even if the guide ribs 430 overrun on the driving roller 420, since the frictional force generated n between the guide ribs 430 and a low friction region 440 is small, the guide ribs 430 return to a position in which each of the guide ribs 430 contacts an end face of the driving roller 420 by sliding toward the end face of the driving roller 420. Therefore, the guide ribs 430 can be prevented from overrunning on the driving roller 420 for an extended time.

Subsequently, description will be made of a second embodiment of the present invention. In the second embodiment and the embodiments subsequent thereto, description of features common to the first embodiment is properly omitted to avoid duplication.

Figure 4:
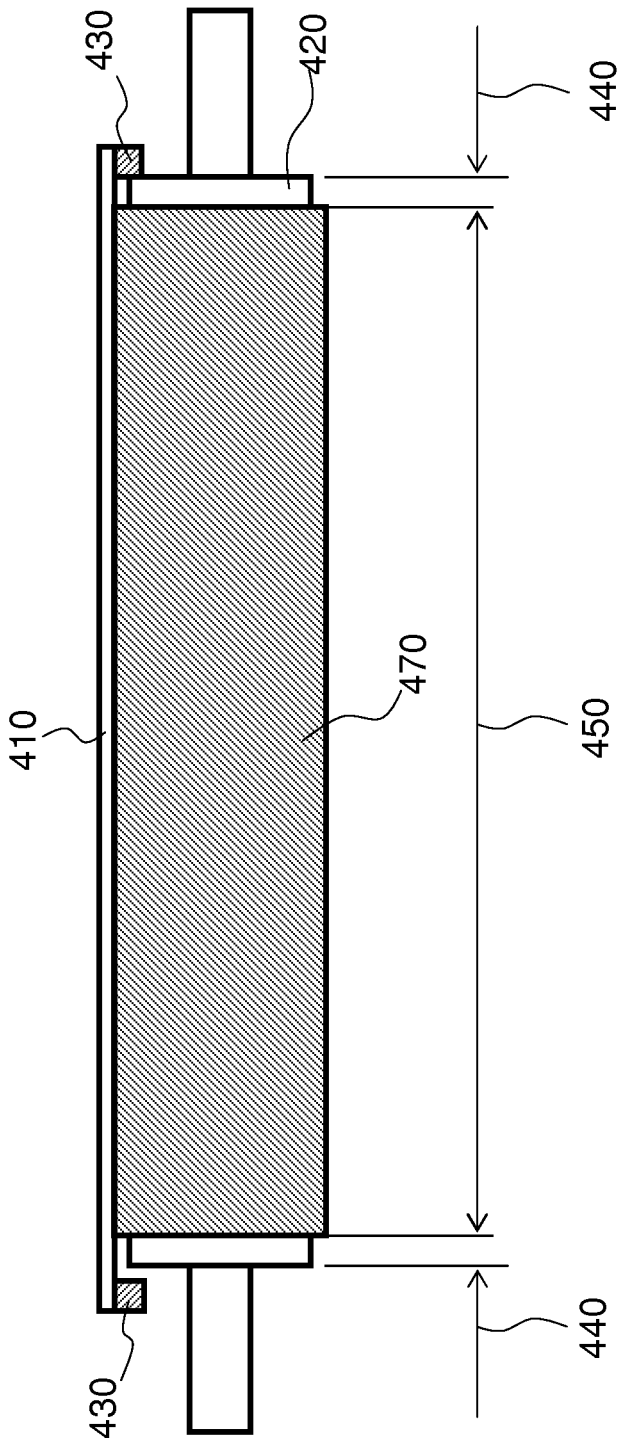
FIG. 4 is a side elevational view of a configuration of a secondary transfer belt unit according to a second embodiment of n the present invention.
Figure 5:
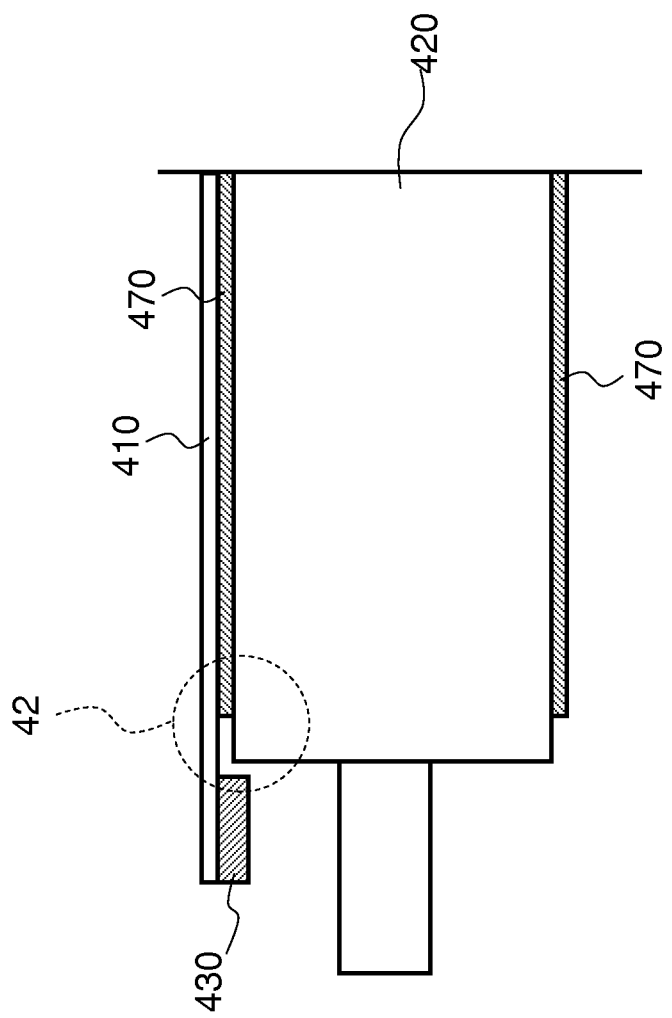
FIG. 5 is a sectional side elevational view of the configuration of the secondary transfer belt unit according to the second embodiment of the present invention.

FIG. 4 is a side elevational view of the configuration of the secondary transfer belt unit 40 according to the second embodiment of the present invention. FIG. 5 is a sectional side elevational view of the configuration of the secondary transfer belt unit 40 according to the second embodiment of the present invention.

The secondary transfer belt unit 40 may preferably include elastic rubber 470. The elastic rubber 470 is wound around an outer peripheral surface (a region 450) other than the low friction region 440 of the driving roller 420. In addition, the elastic rubber 470 has a friction coefficient that is higher than the friction coefficient of the low friction region 440.

Thus, by winding the elastic rubber 470 around the driving roller 420, as shown in a dashed line area 42, an uneven level is created between the driving roller 420 and the elastic rubber 470.

With this configuration, since the elastic rubber 470 need only be attached by winding around the cylindrical driving roller 420, the secondary transfer belt unit 40 can be easily is manufactured.

Moreover, with this configuration, since the frictional force generated between the secondary transfer belt 410 and the driving roller 420 is larger than the frictional force generated between the secondary transfer belt 410 and the elastic rubber 470, the holding power of the secondary transfer belt 410 increases, which can improve the driving accuracy of the secondary transfer belt 410.

Furthermore, with this configuration, even if the guide ribs 430 overrun on the driving roller 420, since the frictional force generated between the guide ribs 430 and a low friction region 440 is small, the guide ribs 430 return to a position in which each of the guide ribs 430 contacts an end face of the driving roller 420 by sliding toward the end face of the driving roller 420. Therefore, the guide ribs 430 can be prevented from overrunning onto the driving roller 420 for an extended time.

Additionally, with this configuration, even if the guide ribs 430 overrun on the driving roller 420, since the guide ribs 430 slide toward the end faces of the driving roller 420, the guide ribs 430 are unlikely to contact the elastic rubber 470, thus preventing the elastic rubber 470 from being shaved.

Subsequently, description will be made of a third embodiment of the present invention.

Figure 6:
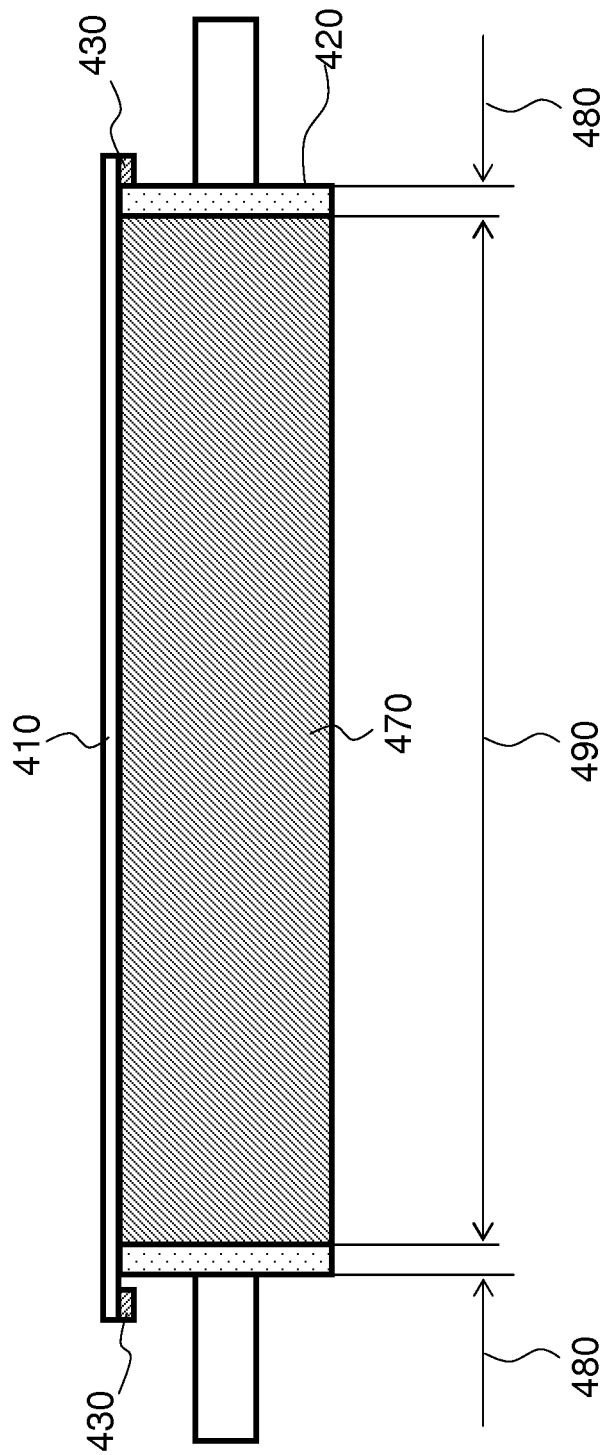
FIG. 6 is a side elevational view of a configuration of is the secondary transfer belt unit according to a third embodiment of the present invention.

FIG. 6 is a side elevational view of the configuration of the secondary transfer belt unit 40 according to the third is embodiment of the present invention.

The secondary transfer belt unit 40 may preferably include elastic rubber 470. The elastic rubber 470 may preferably be wound around the entirety of the outer peripheral surface of the driving roller 420. Additionally, the elastic rubber 470 has a first region 480 corresponding to the low friction region 440 of the driving roller 420 and a second region 490 corresponding to all other regions: the first region 480 is mirror finished and the second region 490 has a friction coefficient that is higher than a friction coefficient of the first region 480.

Thus, by winding the elastic rubber 470 around the entirety of the driving roller 420, no uneven level is created in the entirety of the driving roller.

With this configuration, since the elastic rubber 470 need only be attached by winding around the cylindrical driving roller 420, the secondary transfer belt unit 40 can be easily manufactured.

Moreover, with this configuration, since the frictional force generated between the secondary transfer belt 410 and the driving roller 420 is larger than the frictional force generated n between the secondary transfer belt 410 and the elastic rubber 470, the holding power of the secondary transfer belt 410 increases, which can improve the driving accuracy of the secondary transfer belt 410.

Furthermore, with this configuration, even if the guide is ribs 430 overrun on the driving roller 420, since the frictional force generated between the guide ribs 430 and a low friction region 440 is small, the guide ribs 430 return to a position in which each of the guide ribs 430 contacts an end face of the driving roller 420 by sliding toward the end face of the driving roller 420. Therefore, the guide ribs 430 can be prevented from overrunning onto the driving roller 420 for an extended time.

Subsequently, description will be made of a fourth embodiment of the present invention.

Figure 7:
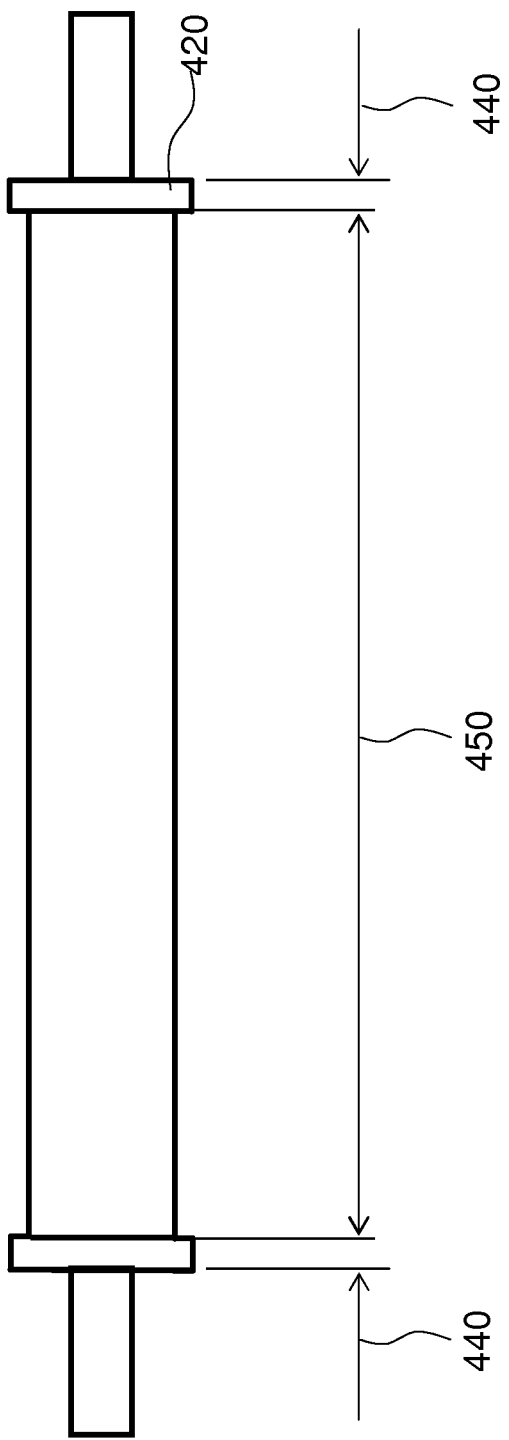
FIG. 7 is a side elevational view of a configuration of a driving roller of a secondary transfer belt unit according to a fourth embodiment of the present invention.
Figure 8:
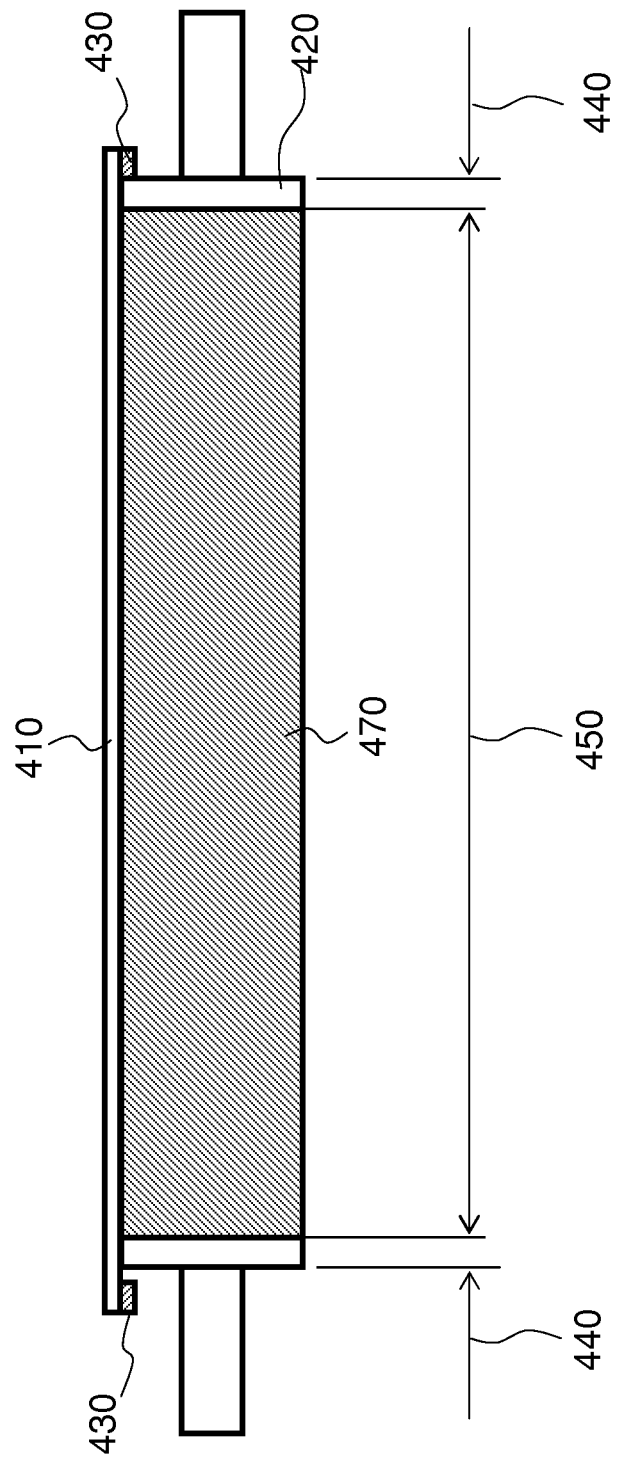
FIG. 8 is a side elevational view of the configuration of the secondary transfer belt unit according to the fourth embodiment of the present invention.
Figure 9:
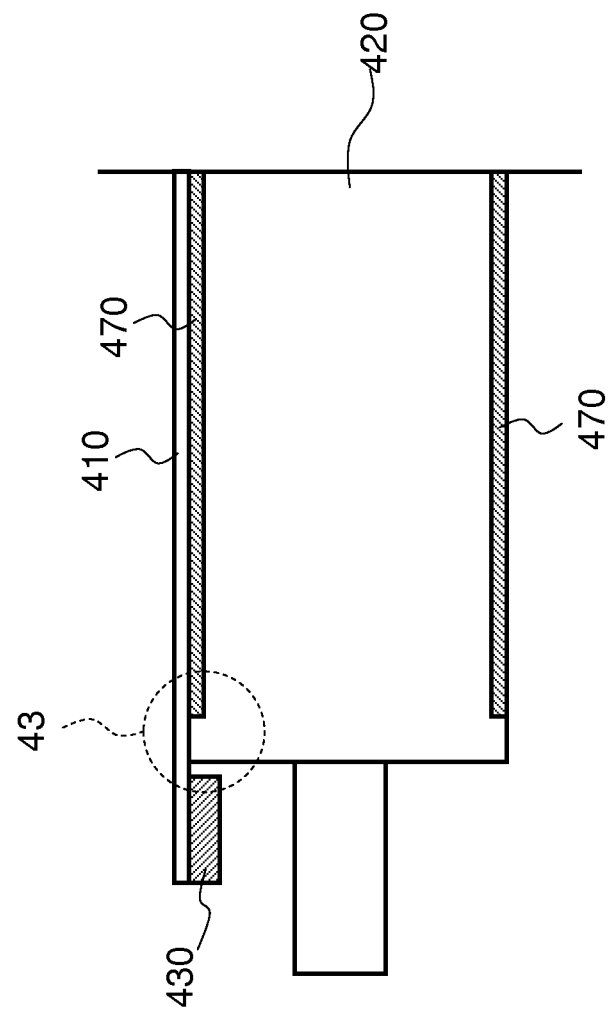
FIG. 9 is a sectional side elevational view of the configuration of the secondary transfer belt unit according to the fourth embodiment of the present invention.
Figure 10:
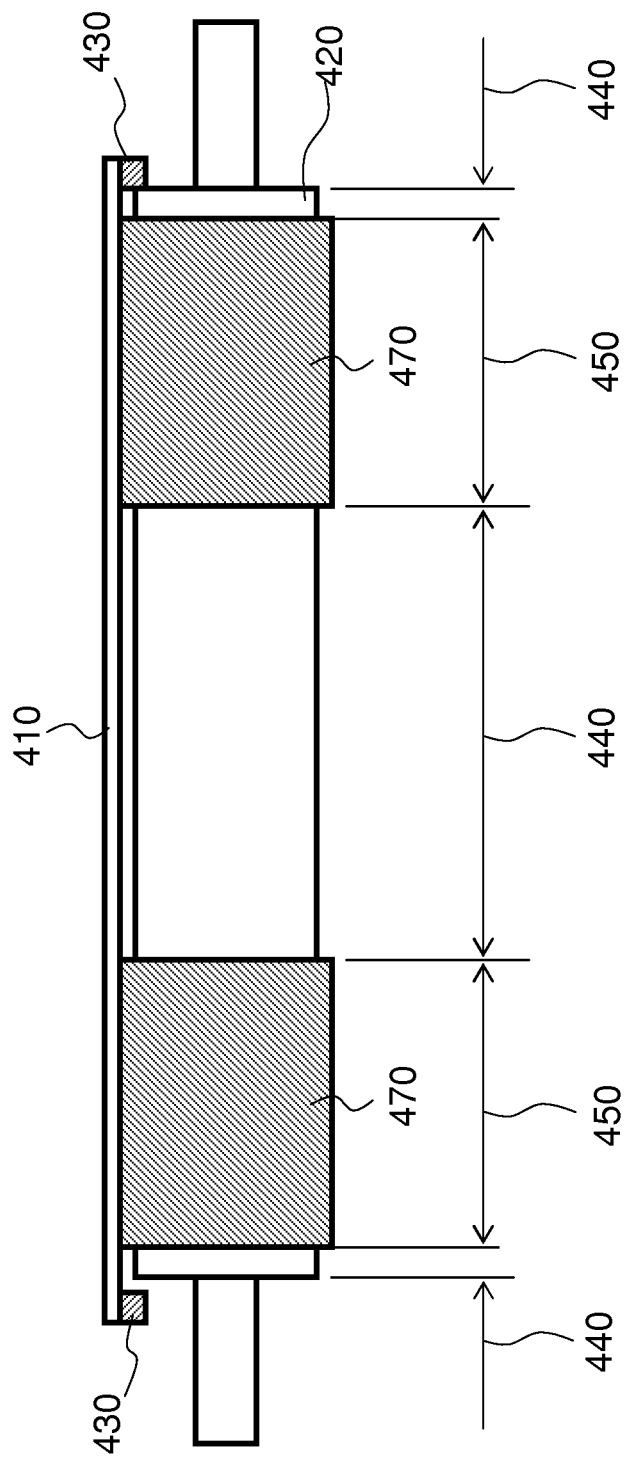
FIG. 10 is a side elevational view of a configuration of a secondary transfer belt unit according to a fifth embodiment of the present invention.
Figure 11:
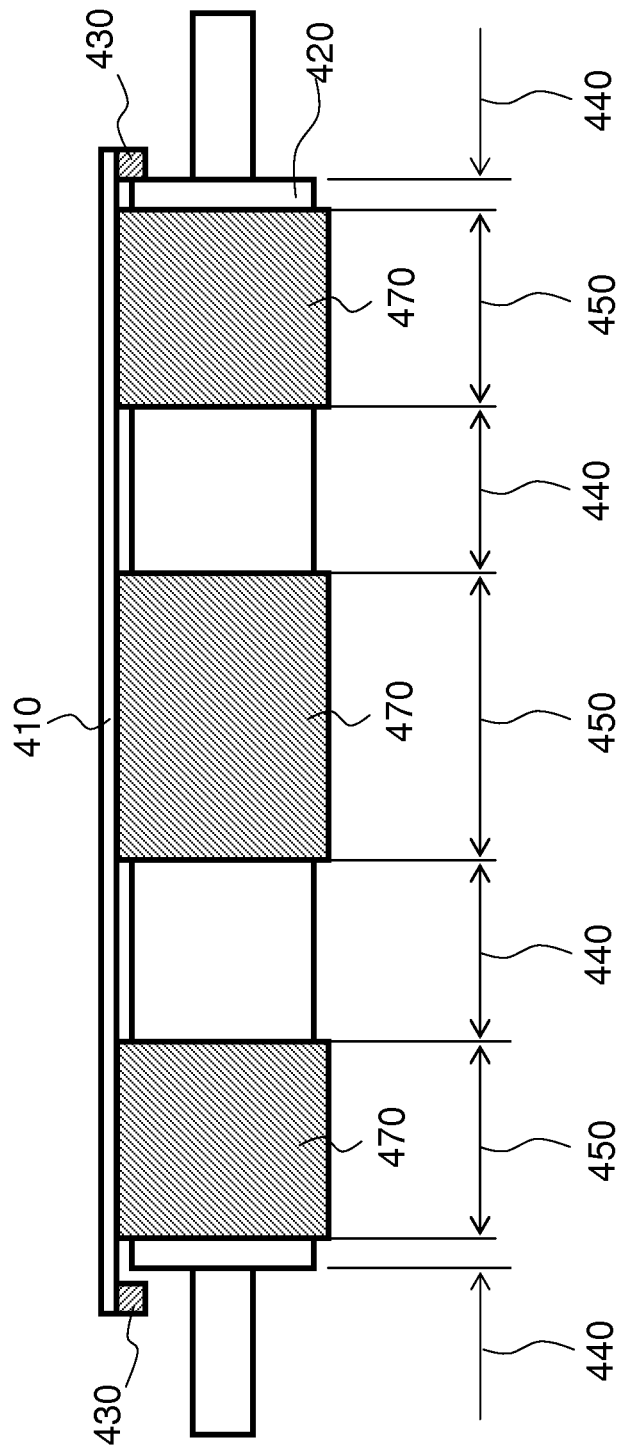
FIG. 11 is a side elevational view of the configuration of the secondary transfer belt unit according to the fifth embodiment of the present invention.
Figure 12:
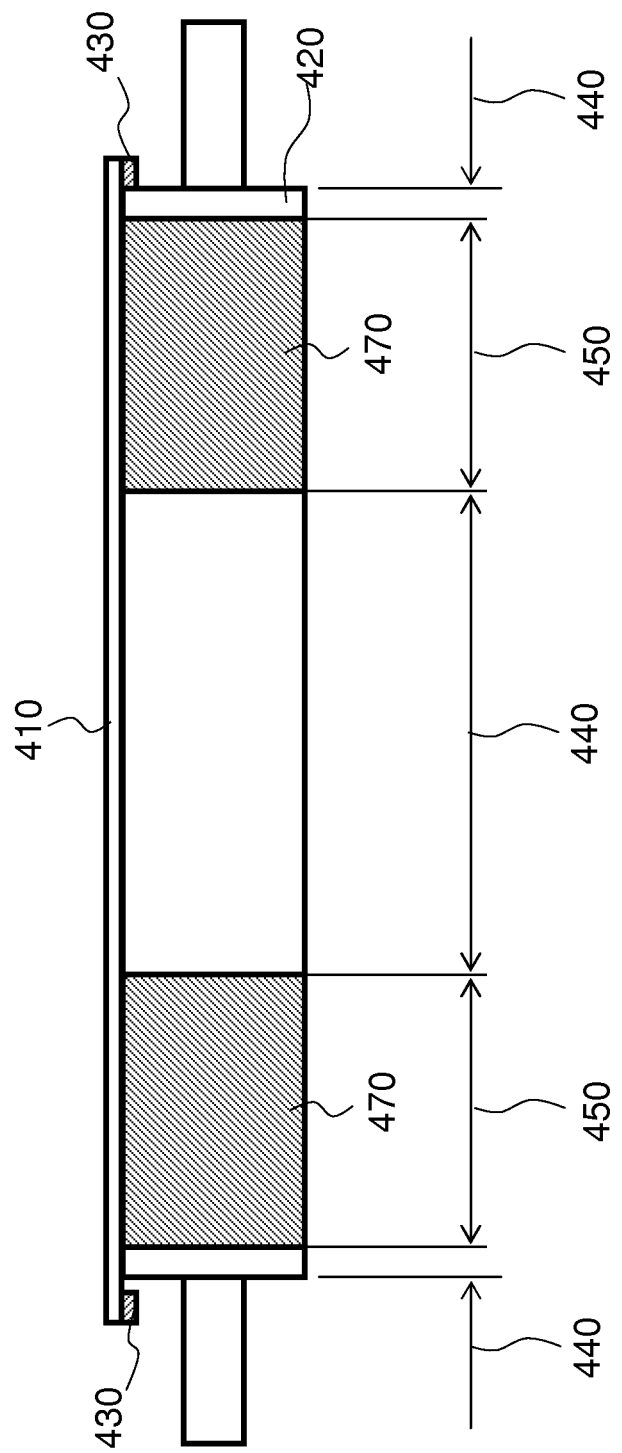
FIG. 12 is a side elevational view of the configuration of the secondary transfer belt unit according to the fifth embodiment of the present invention.
Figure 13:
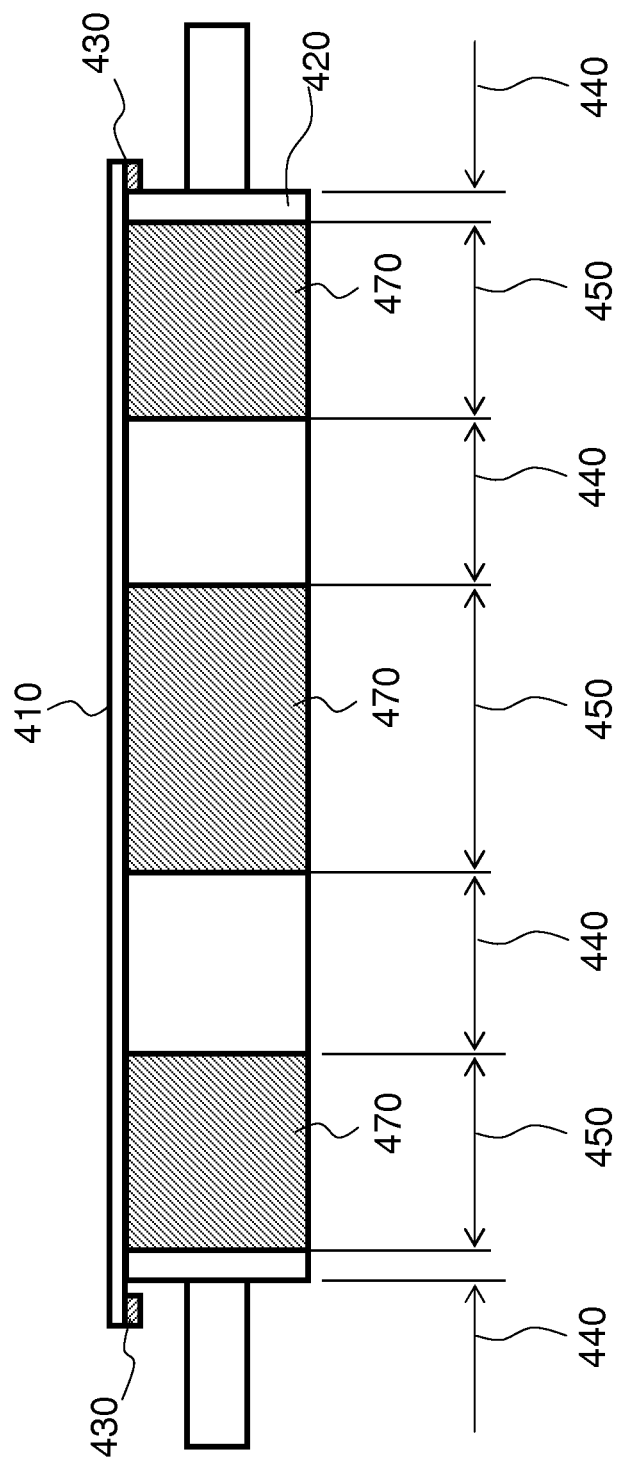
FIG. 13 is a side elevational view of the configuration of the secondary transfer belt unit according to the fifth embodiment of the present invention.

FIG. 7 is a side elevational view of a configuration of the driving roller 420 in the secondary transfer belt unit 40 according to the fourth embodiment of the present invention. FIG. 8 is a side elevational view of the configuration of the secondary transfer belt unit 40 according to the fourth embodiment of the present invention. FIG. 9 is a sectional side elevational view of the configuration of the secondary transfer belt unit 40 according to the fourth embodiment of the present invention.

The driving roller 420 may preferably have a recessed portion on the outer peripheral surface (a region 450) other than the low friction region 440, the recessed portion having a volume equal to the elastic rubber 470. The elastic rubber 470 may also be wound around the recessed portion of the driving roller 420. The low friction region 440 of the driving roller 420 may be configured to have an external diameter that is is identical to an external diameter of a region of the elastic rubber in a state in which the driving roller is wound with the elastic rubber 470.

Thus, by winding the elastic rubber 470 around the driving roller 420, as shown in a dashed line area 43, no uneven level is created between the driving roller 420 and the elastic rubber 470.

With this configuration, the elastic rubber 470 is wound around the recess portion of the driving roller 420 and the elastic rubber 470 is positioned in the recess portion, which improves intimate contact between the driving roller 420 and the elastic rubber 470.

In addition, with this configuration, since the frictional force generated between the secondary transfer belt 410 and the driving roller 420 is larger than the frictional force generated between the secondary transfer belt 410 and the elastic rubber 470, the holding power of the secondary transfer belt 410 increases, which can improve the driving accuracy of the secondary transfer belt 410.

Furthermore, with this configuration, even if the guide ribs 430 overrun on the driving roller 420, since the frictional force generated between the guide ribs 430 and a low friction region 440 is small, the guide ribs 430 return to a position in which each of the guide ribs 430 contacts an end face of the driving roller 420 by sliding toward the end face of the driving is roller 420. Therefore, the guide ribs 430 can be prevented from overrunning onto the driving roller 420 for an extended time.

Additionally, with this configuration, even if the guide ribs 430 overrun on the driving roller 420, since the guide ribs 430 slide toward the end faces of the driving roller 420, the guide ribs 430 are unlikely to contact the elastic rubber 470, thus preventing the elastic rubber 470 from being shaved.

Subsequently, description will be made of a fifth embodiment of the present invention.

FIG. 10 to FIG. 13 are side elevational views of the configuration of the secondary transfer belt unit 40 according to the fifth embodiment of the present invention.

Thus, by providing the low friction region 440 in a region other than both opposite lengthwise ends of the driving roller 420, the friction coefficient of the region 450 adjacent to the low friction region 440 can be made higher than the friction coefficient of the low friction region 440.

With this configuration, even if the guide ribs 430 overrun on the driving roller 420, since the frictional force generated between the guide ribs 430 and a low friction region 440 is small, the guide ribs 430 return to a position in which each of the guide ribs 430 contacts an end face of the driving roller 420 by sliding toward the end face of the driving roller 420. Therefore, the guide ribs 430 can be prevented from overrunning on the driving roller 420 for an extended time.

It is to be noted that, as shown in the first to the fifth embodiments of the present invention, the width of the low friction region 440 may preferably be set to a width not less than the half of the width of the guide rib 430. This configuration allows consistent recovery of the secondary transfer belt 410 in a case in which the secondary transfer belt 410 meanders.

Finally, the above described embodiments are to be considered in all respects as illustrative and not restrictive. The scope of the present invention is defined not by above described embodiments but by the claims. Further, the scope of the present invention is intended to include all modifications that come within the meaning and scope of the claims and any equivalents thereof.

What is claimed is:

1. A belt unit comprising:
an endless belt;
a driving roller that is disposed on an inner peripheral surface side of the endless belt and drives the endless belt;
a pair of guide ribs that is placed on each opposite widthwise end of the inner peripheral surface of the endless belt and contact both end faces of the driving roller, thus preventing meandering of the endless belt; and
elastic rubber that is wound around at least the both opposite lengthwise ends of the outer peripheral surface of the driving roller, wherein:
the elastic rubber has a first region at sides of both end faces of the driving roller and a second region adjacent to the first region;
the first region is mirror finished; and
the second region has a friction coefficient that is higher than a friction coefficient of the first region.

2. The belt unit according to claim 1, further comprising:
a secondary transfer roller that is disposed as opposed to a primary transfer belt contacting the endless belt and having a surface on which a toner image is formed, wherein:
the secondary transfer roller transfers the toner image that is formed on the primary transfer belt, onto a sheet that reaches a position in which the endless belt contacts the primary transfer belt.

3. An image forming apparatus comprising:
the belt unit according to claim 1; and
a fixing unit that is disposed on a downstream side from the belt unit and fixes on a sheet a toner image that is transferred onto the sheet by the belt unit.

4. A belt unit comprising:
an endless belt;
a driving roller that is disposed on an inner peripheral surface side of the endless belt and drives the endless belt; and
a pair of guide ribs that is placed on each opposite widthwise end of the inner peripheral surface of the endless belt and contacts both end faces of the driving roller, thus preventing meandering of the endless belt, wherein:
the driving roller is equipped with a low friction region at both opposite lengthwise ends in a predetermined width;
the low friction region has a friction coefficient that is lower than a friction coefficient of a region adjacent to the low friction region;
the low friction region and the region adjacent to the low friction region are made of a single member; and
the region adjacent to the low friction region is knurled.

* * * * *